US008669727B2

(12) United States Patent
Okita et al.

(10) Patent No.: US 8,669,727 B2
(45) Date of Patent: Mar. 11, 2014

(54) DETECTION DEVICE FOR DETECTING MAGNETIC POLE POSITION OF SYNCHRONOUS MOTOR, AND CONTROL APPARATUS EQUIPPED THEREWITH

(75) Inventors: Tadashi Okita, Yamanashi (JP); Yukio Toyozawa, Yamanashi (JP); Kenji Takahashi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/431,020

(22) Filed: Mar. 27, 2012

(65) Prior Publication Data

US 2012/0249025 A1   Oct. 4, 2012

(30) Foreign Application Priority Data

Apr. 1, 2011   (JP) .................. 2011-082025

(51) Int. Cl.
*H02P 21/00*   (2006.01)
(52) U.S. Cl.
USPC .................. 318/400.02; 318/400.01; 318/700
(58) Field of Classification Search
USPC ................... 318/400.01, 400.02, 700
See application file for complete search history.

(56) References Cited

U.S. PATENT DOCUMENTS

| 5,652,495 | A * | 7/1997 | Narazaki et al. ............. 318/716 |
| 6,940,250 | B2 * | 9/2005 | Nishimura et al. ........... 318/705 |
| 2005/0104551 | A1 | 5/2005 | Nishimura et al. |
| 2009/0039810 | A1 | 2/2009 | Gotz et al. |
| 2009/0267547 | A1 | 10/2009 | Watanabe |
| 2010/0286948 | A1 * | 11/2010 | Terada et al. ................. 702/150 |

FOREIGN PATENT DOCUMENTS

| DE | 102004009638 A1 | 10/2004 |
| DE | 112008003590 T5 | 11/2010 |
| EP | 2023479 A1 | 2/2009 |
| JP | 2004072902 A | 3/2004 |
| JP | 2004-274855 A | 9/2004 |
| JP | 2005-269761 A | 9/2005 |
| WO | 2008120580 A1 | 10/2008 |
| WO | 2009095963 A1 | 8/2009 |

OTHER PUBLICATIONS

Office Action mailed Jun. 28, 2013 corresponds to German patent application No. 10 2012 005 970.1.
A JP Office Action, dated Jul. 31, 2012, issued in JP Application No. 2011-082025.

* cited by examiner

*Primary Examiner* — Kawing Chan
(74) *Attorney, Agent, or Firm* — Lowe Hauptman & Ham, LLP

(57) ABSTRACT

A detection device for detecting a magnetic pole position of a synchronous motor includes a generating unit for generating a magnetic pole correction value based on the difference between a forward rotation d-phase voltage command and a reverse rotation d-phase voltage command, the d-phase voltage commands being used for rotating the synchronous motor and generated when the synchronous motor is driven in forward and reverse directions, respectively, by applying a prescribed d-phase current command after detecting a magnetic pole initial position at power-on of the synchronous motor, and a correcting unit for correcting the magnetic pole initial position based on the magnetic pole correction value and on a sensor reference position which defines a reference position of a sensor attached to the synchronous motor, and a control apparatus equipped with the detection device controls the rotation of the synchronous motor based on the corrected magnetic pole initial position.

2 Claims, 8 Drawing Sheets

DETECTION DEVICE FOR DETECTING MAGNETIC POLE POSITION OF SYNCHRONOUS MOTOR, AND CONTROL APPARATUS EQUIPPED THEREWITH

RELATED APPLICATIONS

The present application is based on, and claims priority from, Japanese Application Number 2011-082025, filed Apr. 1, 2011, the disclosure of which is hereby incorporated by reference herein in its entirety.

BACKGROUND OF THE INVENTION

1. Field of the Invention

The present invention relates to a detection device for detecting the magnetic pole position of a synchronous motor that is controlled based on a d-phase current command and a q-phase current command, and to a control apparatus equipped with such a detection device.

2. Description of the Related Art

In a synchronous motor, desired torque is produced by supplying current to an appropriate excitation phase winding according to the magnetic pole position of the rotor by using a d-q coordinate control system. Such synchronous motors are classified as two types: one that is equipped with a magnetic pole position sensor such as an encoder for detecting the magnetic pole position of the rotor, and one that is not.

In the case of a synchronous motor not equipped with such a magnetic pole position sensor, each time the synchronous motor is powered up (started up), a magnetic pole position detection is performed to detect the initial position of the magnetic pole (hereinafter called the "magnetic pole initial position"), and the rotation of the synchronous motor is controlled based on the magnetic pole position detected relative to the magnetic pole initial position. However, if the accuracy of the power-on magnetic pole position detection varies, the torque constant for driving the synchronous motor also varies, which may result in an inability to produce maximum torque. In particular, when driving the synchronous motor up to a high-speed where field weakening control becomes necessary, if the magnetic pole position is displaced, an appropriate d-phase current cannot be supplied, resulting in an inability to supply sufficient drive voltage to the synchronous motor, and therefore the control may become unstable.

In one method to address this problem, in such cases as when starting up the synchronous motor for the first time or when performing replacement or maintenance of a motor sensor, a magnetic pole correction value Or which represents the amount of displacement between the reference position of the magnetic pole and the reference position of the rotation sensor of the synchronous motor is stored in advance in a nonvolatile memory, and when the reference position of the rotation sensor of the synchronous motor is first detected after detecting the magnetic pole position at power-on of the synchronous motor, the magnetic pole position to be used for rotation control is corrected based on the magnetic pole correction value θr corresponding to that reference position so that the control can always be performed by reference to the same magnetic pole position during the driving of the synchronous motor. According to this method, once the magnetic pole correction value θr corresponding to the sensor reference position is stored in the nonvolatile memory, and once the magnetic pole initial position is corrected, the control can always be performed by reference to the magnetic pole correction value θr corresponding to the sensor reference position.

On the other hand, in the method proposed in Japanese Unexamined Patent Publication No. 2004-072902, the reference point of an encoder is first aligned with the reference point (U phase) on the stator of a motor locked under DC excitation, and then, the amount of displacement is calculated from the initial magnetic pole estimation result and encoder position information and stored in an encoder memory, and the magnetic pole position is corrected based on the amount of displacement thus stored.

In the method that uses the magnetic pole correction value, when the reference position of the rotation sensor of the synchronous motor is first detected after detecting the magnetic pole position at power-on of the synchronous motor, the magnetic pole position relative to the magnetic pole initial position corresponding to that reference position is set as the magnetic pole correction value. However, since the accuracy of the magnetic pole position detection varies, as described above, there is a need to perform the magnetic pole position detection a plurality of times in order to reduce the effect of the detection accuracy variation on the magnetic pole correction value setting, and hence the problem that it takes time to make the setting. Further, this method does not provide any particular metric as to how many times the magnetic pole position detection should be performed, and thus involves the problem that the amount of error contained in the magnetic pole correction value cannot be reduced sufficiently.

One possible method of setting the magnetic pole correction value would be to make adjustments by increasing or decreasing fine adjustment parameters so that there would be no difference in acceleration time or torque command, regardless of whether the synchronous motor is rotated in the forward direction or reverse direction. With this method, however, in the case of a non-salient pole synchronous motor in which torque control is performed using the q-phase current while controlling the d-phase current to zero, since the real q-phase current (i.e., the projection of the q-phase current command on the real q-axis) required to drive the motor in either direction becomes the same in magnitude regardless of whether the magnetic pole position is displaced or not, there occurs no difference in the magnitude of the torque command or the real torque; accordingly, this method cannot be used for non-salient pole synchronous motors.

On the other hand, in the invention disclosed in Japanese Unexamined Patent Publication No. 2004-072902, since the amount of displacement is calculated using the initial magnetic pole estimation result, there is the problem that if the initial magnetic pole estimation result contains an error, the amount of displacement stored in the encoder memory also contains an error.

SUMMARY OF THE INVENTION

In view of the above problems, it is an object of the present invention to provide, for use with a synchronous motor not equipped with a magnetic pole position sensor and whose rotation is controlled based on a d-phase current command and a q-phase current command, a detection device that can detect with high accuracy and in a short time the magnetic pole correction value to be used for correcting the magnetic pole initial position detected in a magnetic pole detection process when sensor reference position is detected and can store the thus detected correction value in a nonvolatile memory; it is also an object of the invention to provide a control apparatus equipped with such a detection device.

To achieve the above object, according to the present invention, there is provided a detection device for detecting a magnetic pole position of a synchronous motor that is controlled based on a d-phase current command and a q-phase current command, including: generating unit for generating a magnetic pole correction value based on a difference between a forward rotation d-phase voltage command and a reverse rotation d-phase voltage command, the d-phase voltage commands being used for rotating the synchronous motor and generated when the synchronous motor is driven in forward and reverse directions, respectively, by applying a prescribed d-phase current command after detecting a magnetic pole initial position in a magnetic pole detection process at power-on of the synchronous motor; and correcting unit for correcting the magnetic pole initial position based on the magnetic pole correction value and on a sensor reference position which defines a reference position of a sensor attached to the synchronous motor.

The prescribed d-phase current command applied to the synchronous motor by the generating unit is a constant value when the synchronous motor is a non-salient pole synchronous motor, and zero when the synchronous motor is a salient-pole synchronous motor. Further, the correcting unit corrects the magnetic pole initial position by subtracting, from the magnetic pole correction value, the magnetic pole position detected relative to the magnetic pole initial position corresponding to the sensor reference position and by adding the result of the subtraction to the magnetic pole initial position.

The generating unit includes: a initial setting unit for setting an initial candidate value for the magnetic pole correction value by reference to the magnetic pole initial position detected at power-on of the synchronous motor; a calculating unit for calculating an amount of magnetic pole displacement representing an axis displacement between d-q axes of a control system and d-q axes of a motor system, based on a d-phase current feedback value and a q-phase current feedback value of motor currents flowing into the synchronous motor and detected when the synchronous motor is driven in the forward and reverse directions, respectively, by applying the prescribed d-phase current command under conditions of either the initial value and the magnetic pole initial position or the set candidate value and the magnetic pole position, and for calculating the difference between the forward rotation d-phase voltage command and the reverse rotation d-phase voltage command; a decision unit for deciding whether the difference between the forward rotation d-phase voltage command and the reverse rotation d-phase voltage command, calculated by the calculating unit, lies within a predetermined threshold value; an updating unit for setting a new candidate value by adding a value corresponding to the amount of magnetic pole displacement to the initial value or the candidate value when it is decided by the decision unit that the difference lies outside the predetermined threshold value, and for setting a new magnetic pole position by displacing the magnetic pole initial position or the magnetic pole position by an amount equal to the amount of magnetic pole displacement; and a determining unit for determining the candidate value when it is decided by the decision unit that the difference lies within the predetermined threshold value, and for storing the determined candidate value as the magnetic pole correction value in a memory, and wherein the calculating unit and the updating unit repeat the calculation and update process until the decision unit decides that the difference lies within the predetermined threshold value.

The generating unit may further includes: a display unit for causing the initial candidate value set by the initial setting unit, as well as the difference and the amount of magnetic pole displacement calculated by the calculating unit, to be displayed; and decision unit for deciding whether an externally supplied termination command has been received or not; the updating unit in the generating unit may be configured to set a new candidate value by adding a value corresponding to an externally supplied amount to the initial value or the candidate value when it is decided by the decision unit that the termination command has not been received, and to also set a new magnetic pole position by displacing the magnetic pole initial position or the magnetic pole position by an amount equal to the externally supplied amount, and the determining unit in the generating unit may be configured to determine the candidate value when it is decided by the decision unit that the termination command has been received and to store the determined candidate value as the magnetic pole correction value in a memory.

A synchronous motor control apparatus according to the present invention is equipped with the above detection device, and controls the rotation of the synchronous motor based on the magnetic pole position detected relative to the magnetic pole initial position corrected by the correcting unit of the detection device.

BRIEF DESCRIPTION OF THE DRAWINGS

The present invention will be more clearly understood with reference to the following accompanying drawings.

DETAILED DESCRIPTION

A detection device for detecting the magnetic pole position of a synchronous motor and a control apparatus equipped with the same will be described below with reference to the drawings. It should, however, be understood that the present invention is not limited to the embodiments described herein or to those illustrated in the accompanying drawings.

Figure 1:
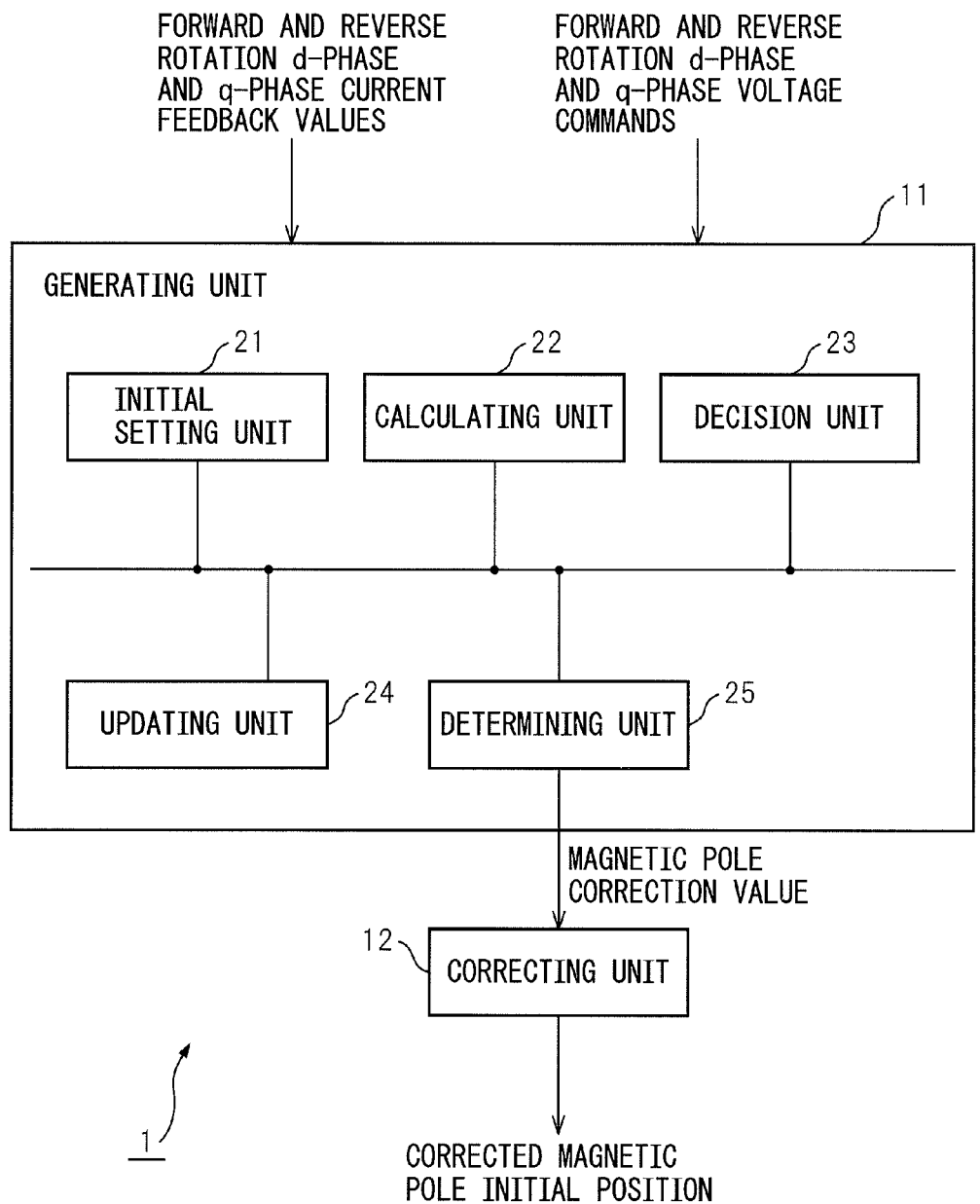
FIG. 1 is a basic functional block diagram of a detection device according to a first embodiment of the present invention.

FIG. 1 is a basic functional block diagram of a detection device according to a first embodiment of the present invention. It is to be understood that, throughout the different drawings given herein, the same reference numerals designate component elements having the same functions.

The detection device 1 according to the first embodiment of the present invention is designed to detect the magnetic pole position of a synchronous motor that is controlled based on a d-phase current command and a q-phase current command, and is implemented as one function within the control apparatus (not shown in FIG. 1) that controls the rotation of the synchronous motor.

The detection device 1 includes: a generating unit 11 for generating a magnetic pole correction value based on a difference between a forward rotation d-phase voltage command and a reverse rotation d-phase voltage command, the d-phase voltage commands being used for rotating the synchronous motor and generated when the synchronous motor is driven in forward and reverse directions, respectively, by applying a prescribed d-phase current command after detecting a magnetic pole initial position at power-on of the synchronous motor; and a correcting unit 12 for correcting the magnetic pole initial position based on the magnetic pole correction value and on a sensor reference position which defines a reference position of a sensor attached to the synchronous motor. While the details will be described later, it is to be noted that the prescribed d-phase current command applied to the synchronous motor by the generating unit 11 is a constant value when the synchronous motor is a non-salient pole synchronous motor, and zero when the synchronous motor is a salient-pole synchronous motor.

The generating unit 11 includes an initial setting unit 21, a calculating unit 22, a decision unit 23, an updating unit 24, and a determining unit 25.

When the sensor reference position is detected, the initial setting unit 21 in the generating unit 11 detects the magnetic pole position corresponding to the sensor reference position by reference to the magnetic pole initial position detected at the power-on of the synchronous motor, and sets an initial candidate value for the magnetic pole correction value by taking the thus detected magnetic pole position. As will be described later, the initial candidate value is updated by the updating unit 24 which thus sets a new candidate value.

The calculating unit 22 in the generating unit 11 calculates an amount of magnetic pole displacement representing an axis displacement between the d-q axes of the control system and the d-q axes of the motor system, based on a d-phase current feedback value and a q-phase current feedback value of motor currents flowing into the synchronous motor and detected when the synchronous motor is driven in the forward and reverse directions, respectively, by applying the prescribed d-phase current command under conditions of either the initial candidate value and the magnetic pole initial position or the above-set candidate value and the magnetic pole position, and also calculates the difference between the forward rotation d-phase voltage command and the reverse rotation d-phase voltage command, based on the forward rotation d-phase voltage command, reverse rotation d-phase voltage command, d-phase current feedback value, and q-phase current feedback value. The mathematical equations to be used here will be described in detail later.

The decision unit 23 in the generating unit 11 decides whether the difference between the forward rotation d-phase voltage command and the reverse rotation d-phase voltage command, calculated by the calculating unit 22, lies within a predetermined threshold value.

When it is decided by the decision unit 23 that the difference between the forward rotation d-phase voltage command and the reverse rotation d-phase voltage command lies outside the predetermined threshold value, the updating unit 24 in the generating unit 11 sets a new candidate value for the magnetic pole correction value by adding a value corresponding to the amount of magnetic pole displacement to the initial value or the candidate value for the magnetic pole correction value, and also sets a new magnetic pole position by displacing the magnetic pole initial position or the magnetic pole position by an amount equal to the amount of magnetic pole displacement.

When it is decided by the decision unit 23 that the difference between the forward rotation d-phase voltage command and the reverse rotation d-phase voltage command lies within the predetermined threshold value, the determining unit 25 in the generating unit 11 stores the candidate value as the determined magnetic pole correction value in memory.

In the generating unit 11, the calculating unit 22 and the updating unit 24 repeat the above calculation and update process until the decision unit 23 decides that the difference between the forward rotation d-phase voltage command and the reverse rotation d-phase voltage command lies within the predetermined threshold value.

Then, the correcting unit 12 corrects the magnetic pole initial position by subtracting the sensor reference position from the magnetic pole correction value and by adding the result of the subtraction to the magnetic pole initial position.

Figure 2:
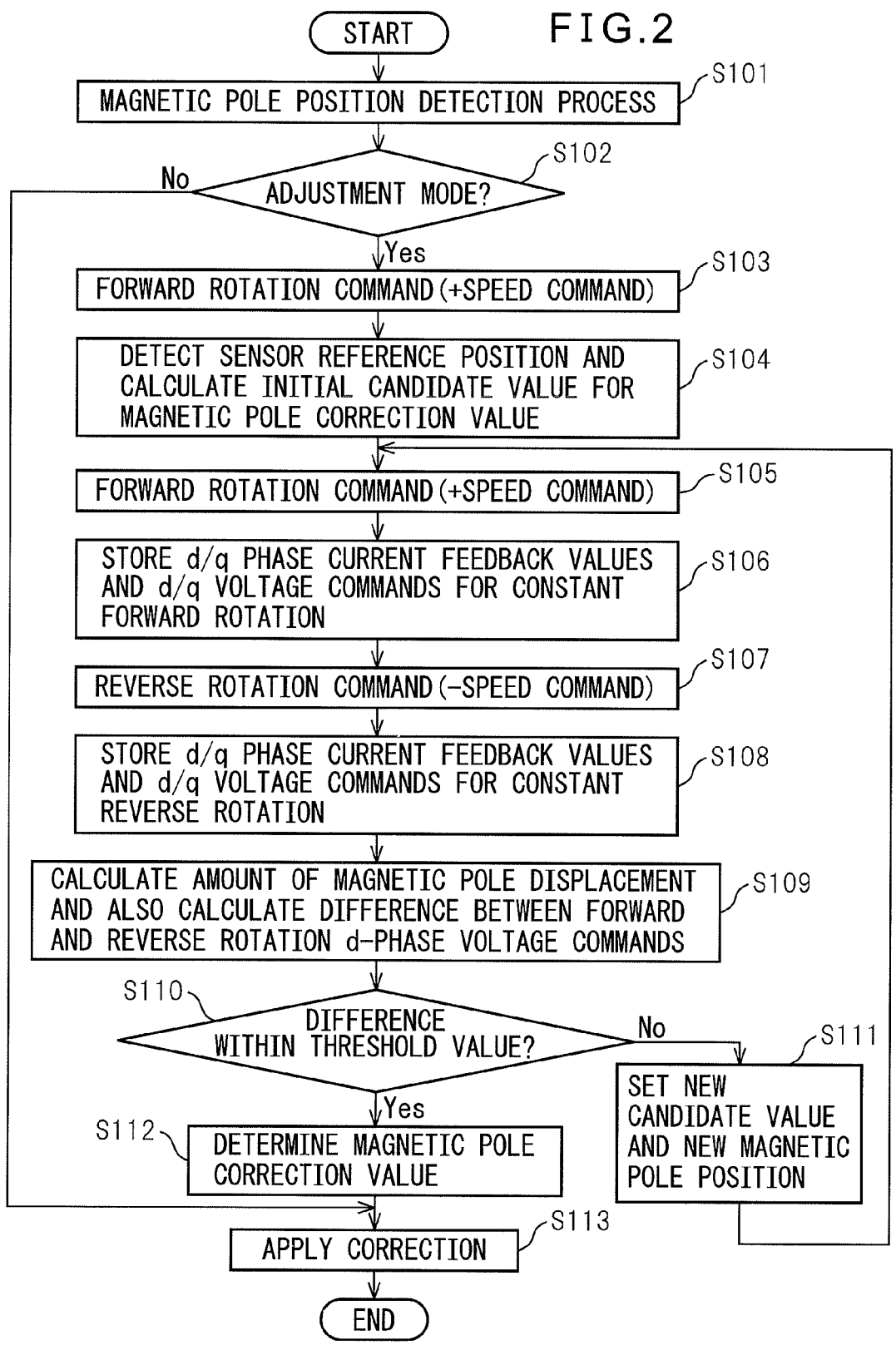
FIG. 2 is a flowchart illustrating the operation flow of the detection device according to the first embodiment of the present invention.

FIG. 2 is a flowchart illustrating the operation flow of the detection device according to the first embodiment of the present invention.

As previously described, generally, in the case of a synchronous motor not equipped with a magnetic pole position sensor, each time the synchronous motor is powered up (started up), a magnetic pole position detection is performed to detect the magnetic pole initial position based on which the rotation of the synchronous motor is controlled. In step S101, this magnetic pole position detection process is performed. The magnetic pole initial position detected in this magnetic pole position detection process contains an error, as previously described. Therefore, the detection device 1 according to the first embodiment of the present invention operates to eliminate the error by correcting the magnetic pole initial position using the magnetic pole correction value. In this specification, the mode in which the detection device 1 operates will hereinafter be referred to as the "adjustment mode", as distinguished from the normal operation mode in which the synchronous motor is actually driven for rotation under control.

In step S102, the control apparatus determines whether the current mode is the adjustment mode or not. If it is determined that the current mode is the adjustment mode, the control apparatus directs the detection device 1 to start operation, and proceeds to step S103.

In step S103, the control apparatus applies a command to the synchronous motor to make one revolution in the forward direction. At this time, a command for the rotational speed of the synchronous motor is also applied.

In step S104, the detection device 1 detects the reference position of the sensor (hereinafter called the "sensor reference position") while the synchronous motor makes one revolution. Then, the detection device 1 calculates the "initial candidate value for the magnetic pole correction value" corresponding to the detected sensor reference position by reference to the magnetic pole initial position detected in step S101, and stores it in memory.

Next, in step S105, the control apparatus applies a prescribed forward rotation d-phase current command to the synchronous motor, causing it to rotate in the forward direction. At this time, a command for the rotational speed of the synchronous motor is also applied. The prescribed forward rotation d-phase current command applied to the synchronous motor is a constant value when the synchronous motor is a non-salient pole synchronous motor, and zero when the synchronous motor is a salient-pole synchronous motor.

In step S106, the detection device 1 calculates the average values Id$_p$ and Iq$_p$ of the d-phase current feedback value and q-phase current feedback value of the motor currents flowing into the synchronous motor and detected when the synchronous motor is rotated in the forward direction, and stores them in memory. Further, the detection device 1 calculates average values by averaging the forward rotation d-phase voltage command Vd$_p$ and the forward rotation q-phase voltage command Vq$_p$ over a predetermined period of time when the synchronous motor is rotated in the forward direction, and stores them in memory.

Next, in step S107, the control apparatus applies a prescribed reverse rotation d-phase current command to the synchronous motor, causing it to rotate in the reverse direction. At this time, a command for the rotational speed of the synchronous motor is also applied. The prescribed reverse rotation d-phase current command applied to the synchronous motor is a constant value when the synchronous motor is a non-salient pole synchronous motor, and zero when the synchronous motor is a salient-pole synchronous motor.

In step S108, the detection device 1 calculates the average values Id$_N$ and Iq$_N$ of the d-phase current feedback value and q-phase current feedback value of the currents flowing into the synchronous motor and detected when the synchronous motor is rotated in the reverse direction, and stores them in memory. Further, the detection device 1 calculates average values by averaging the reverse rotation d-phase voltage command Vd$_N$ and the reverse rotation q-phase voltage command Vq$_N$ over a predetermined period of time when the synchronous motor is rotated in the reverse direction, and stores them in memory.

The above steps S105 and S106 may be performed after the steps S107 and S108 or vice versa.

Next, in step S109, the detection device 1 calculates the amount of magnetic pole displacement, $\Delta\theta$, i.e., the axis displacement between the d-q axes of the control system and the d-q axes of the motor system, and the difference between the forward rotation d-phase voltage command and the reverse rotation d-phase voltage command, based on the forward rotation d-phase current feedback value Id$_p$, forward rotation q-phase current feedback value Iq$_p$, reverse rotation d-phase current feedback value Id$_N$, and reverse rotation q-phase current feedback value Iq$_N$ stored in step S106.

A detailed description will be given of how the detection device 1 in step S109 calculates the amount of magnetic pole displacement, $\Delta\theta$, representing the axis displacement between the d-q axes of the control system (hereinafter called the "control d-q axes") and the d-q axes of the motor system (hereinafter called the "motor d-q axes").

Figure 3:
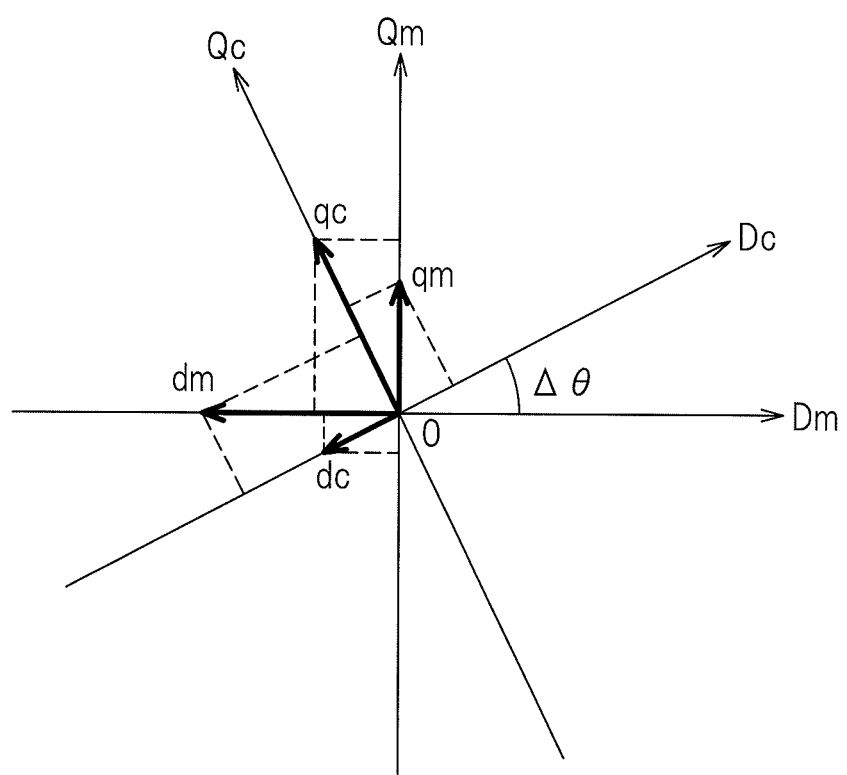
FIG. 3 is a diagram for explaining the displacement between control d-q axes and motor d-q axes.

FIG. 3 is a diagram for explaining the displacement between the control d-q axes and the motor d-q axes. If the control d-q axes and the motor d-q axes are displaced relative to each other by $\Delta\theta$, the magnetic pole position will be detected as being displaced by $\Delta\theta$ between the control d-q axis coordinate system and the motor d-q axis coordinate system. A coordinate transform matrix between the value (dc, qc) on the control d-q axis coordinate system and the value (dm, qm) on the motor d-q axis coordinate system can be expressed as shown in equations (1) and (2) below.

$$\begin{pmatrix} dm \\ qm \end{pmatrix} = \begin{pmatrix} \cos\Delta\theta & -\sin\Delta\theta \\ \sin\Delta\theta & \cos\Delta\theta \end{pmatrix} \begin{pmatrix} dc \\ qc \end{pmatrix} \quad (1)$$

$$\begin{pmatrix} dc \\ qc \end{pmatrix} = \begin{pmatrix} \cos\Delta\theta & \sin\Delta\theta \\ -\sin\Delta\theta & \cos\Delta\theta \end{pmatrix} \begin{pmatrix} dm \\ qm \end{pmatrix} \quad (2)$$

Torque T generated in the synchronous motor is expressed as shown in equation (3) below, where pole denotes the number of pole pairs in the synchronous motor, $\omega$ the frequency, $\omega\phi$ the back electromotive force, Ld and Lq the d-phase and q-phase inductances, respectively, and Idm and Iqm the d-phase and q-phase currents, respectively, on the motor axes.

$$T = \text{pole} \times \{\phi + (Ld-Lq) \times Idm\} \times Iqm \quad (3)$$

When the d-phase and q-phase currents Idm and Iqm on the motor d-q axis coordinate system and the d-phase and q-phase currents Idc and Iqc on the control d-q axis coordinate system are applied to the equation (1), the following equation (4) is obtained.

$$\begin{pmatrix} Idm \\ Iqm \end{pmatrix} = \begin{pmatrix} \cos\Delta\theta & -\sin\Delta\theta \\ \sin\Delta\theta & \cos\Delta\theta \end{pmatrix} \begin{pmatrix} Idc \\ Iqc \end{pmatrix} \quad (4)$$

Substituting the equation (4) into the equation (3) yields the following equation (5).

$$T = \text{pole} \times \{\phi + (Ld-Lq) \times (Idc \cdot \cos\Delta\theta - Iqc \cdot \sin\Delta\theta)\} \times (Idc \cdot \sin\Delta\theta + Iqc \cdot \cos\Delta\theta) \quad (5)$$

When the synchronous motor is a non-salient pole motor, since Ld=Lq, the above equation (5) can be transformed as shown in equation (6) below.

$$T = \text{pole} \times \phi \times Iqm \quad (6)$$
$$= Kt \times Iqm$$
$$= Kt \times (Idc \cdot \sin\Delta\theta + Iqc \cdot \cos\Delta\theta)$$

Figure 4A:
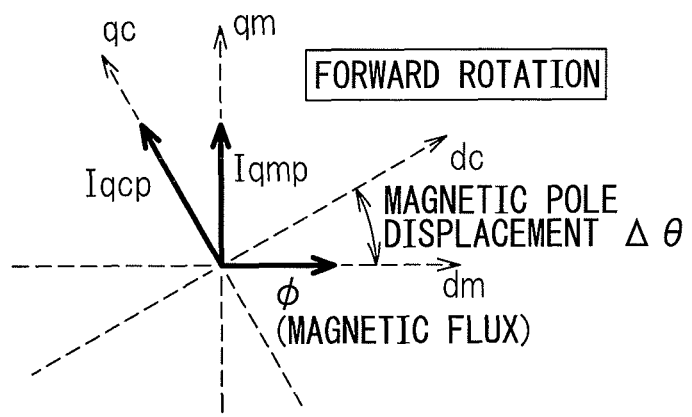
FIGS. 4a and 4b are diagrams for explaining the relationship between forward rotation torque and reverse rotation torque.
Figure 4B:
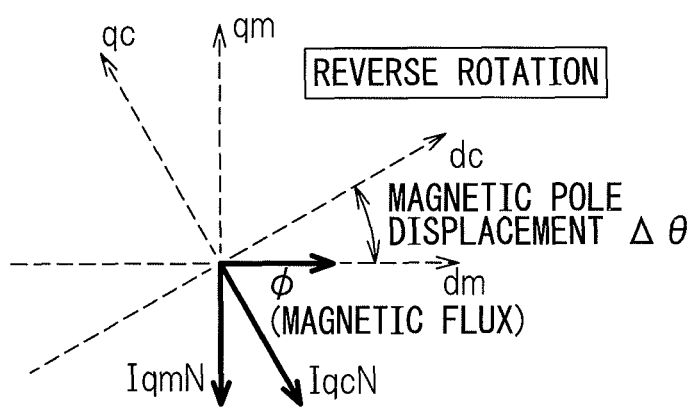

FIGS. 4a and 4b are diagrams for explaining the relationship between forward rotation torque and reverse rotation torque. When the synchronous motor is rotated at a constant speed in the forward and reverse directions, respectively, since the mechanical conditions such as friction are the same for both cases, the torque T$_p$ for forward rotation and the torque T$_N$ for reverse rotation are equal in magnitude but opposite in sign; hence, the relation of equation (7) below holds.

$$T_P = -T_N \quad (7)$$

In a non-salient pole synchronous motor free from reluctance torque, consider the situation where the synchronous motor is rotated in the forward and reverse directions, respectively, with the magnetic pole displaced by $\theta\Delta$, while controlling the d-phase current to zero; then, the results are as shown in FIGS. 4a and 4b. The real torque is determined by "Iqm=Iqc×cos $\Delta\theta$", i.e., the projection on the motor d-q axis coordinate system of the q-phase current Iqc that flows as a result of the speed control, and its value is given as Torque K=Kt×Iqm wherein Kt is the torque constant. Accordingly, since the magnitude of the torque is the same for both the forward and reverse rotations of the synchronous motor, if the magnetic pole is displaced, the torque command or the q-phase current and the generated torque are the same in magnitude, and thus no difference occurs. However, when the constant d-phase current Idc is made to flow, if there is a magnetic pole displacement, the current Iqc that flows as a result of the speed control differs in magnitude according to the direction of rotation, because the q-axis current on the motor d-q coordinate system contains the projection of Idc as shown in the above equation (6) and its influence differs according to the direction of rotation.

When the forward rotation d-phase current on the control d-q axis coordinate system is denoted by $Idc_p$, the forward rotation q-phase current by $Ipc_p$, the reverse rotation d-phase current by $Idc_N$, and the reverse rotation q-phase current by $Ipc_N$, the following equation (8) is obtained from the above equations (6) and (7).

$$Kt \times (Idc_p \cdot \sin \Delta\theta + Iqc_p \cdot \cos \Delta\theta) = -Kt \times (Idc_N \cdot \sin \Delta\theta + Iqc_N \cdot \cos \Delta\theta) \quad (8)$$

Dividing both sides of the equation (8) by $\cos \Delta\theta$ yields the following equation (9).

$$\tan \Delta\theta = \frac{-(Iqc_P + Iqc_N)}{Idc_P + Idc_N} \quad (9)$$

Hence, in the case of a non-salient pole synchronous motor, the displacement $\Delta\theta$ between the control d-q axes and the motor d-q axes, that is, the amount of magnetic pole displacement, $\Delta\theta$, can be obtained from the following equation (10).

$$\Delta\theta = \tan^{-1}\left(-\frac{Iqc_P + Iqc_N}{Idc_P + Idc_N}\right) \quad (10)$$

In the case of a non-salient pole synchronous motor, since the d-phase current command Id is set to a nonzero constant value, $Idc_p$ and $Idc_N$ in the above equation (10) do not both become zero, so that there is no chance that the denominator of the equation (10) will become zero. In the case of a salient-pole synchronous motor, since Ld≠Lq, it is not possible to use the equation (10) which is derived from the equation (6). In the case of a salient-pole synchronous motor, the amount of magnetic pole displacement, $\Delta\theta$, is calculated in the following manner.

When the synchronous motor is a salient-pole motor, Ld≠Lq, but if the d-phase current Idc is set to zero in order to simplify the equation (5), the following equation (11) is obtained from the equations (5) and (7).

$$pole \times \{\phi + (Lq-Ld)Iqc_P \cdot \sin \Delta\theta\} \times Igc_P \cdot \cos \Delta\theta = -pole \times \{\phi + (Lq-Ld) \times Iqc_N \cdot \sin \Delta\theta\} \times Iqc_N \cdot \cos \Delta\theta \quad (11)$$

Rearranging this equation (11) yields the following equation (12).

$$\phi(Iqc_P + Iqc_N) = (Ld-Lq) \times (Iq_P{}^2 + Iqc_N{}^2) \sin \Delta\theta \quad (12)$$

The equation (12) is further rearranged to yield the following equation (13).

$$\sin \Delta\theta = -\frac{\phi/Ld}{(Lq/Ld - 1)} \times \frac{Iq_P + Iq_N}{Iq_P^2 + Iq_N^2} \quad (13)$$

Hence, in the case of a salient-pole synchronous motor, the displacement $\Delta\theta$ between the control d-q axes and the motor d-q axes, that is, the amount of displacement of the magnetic pole displacement, $\Delta\theta$, can be obtained from the following equation (14).

$$\Delta\theta = \sin^{-1}\left(-\frac{\phi/Ld}{(Lq/Ld - 1)} \times \frac{Iq_P + Iq_N}{Iq_P^2 + Iq_N^2}\right) \quad (14)$$

Next, a detailed description will be given of how the detection device 1 in step S109 calculates the difference between the forward rotation d-phase voltage command and the reverse rotation d-phase voltage command. The following equations (15) to (18) are common to both the forward rotation and the reverse rotation.

On the motor d-q axes, the circuit equation of the synchronous motor can be expressed as shown in the following equation (15), where R denotes the resistance, ω the frequency, ωφ the back electromotive force, Ld and Lq the d-phase and q-phase inductances, respectively, Idm and Iqm the d-phase and q-phase currents, respectively, and Vdm and Vqm the d-phase and q-phase voltages, respectively. The differential term Ldt/di is ignored.

$$\begin{pmatrix} Vdm \\ Vqm \end{pmatrix} = R \begin{pmatrix} Idm \\ Iqm \end{pmatrix} + \begin{pmatrix} 0 & -wLq \\ wLd & 0 \end{pmatrix} \begin{pmatrix} Idm \\ Iqm \end{pmatrix} + \begin{pmatrix} 0 \\ w\phi \end{pmatrix} \quad (15)$$

Using the equation (2), the equation (15) is transformed onto the control d-q axes to obtain the following equation (16).

$$\begin{pmatrix} Vdc \\ Vqc \end{pmatrix} = \begin{pmatrix} \cos\Delta\theta & \sin\Delta\theta \\ -\sin\Delta\theta & \cos\Delta\theta \end{pmatrix} \begin{pmatrix} Vdm \\ Vqm \end{pmatrix} \quad (16)$$

$$= R \begin{pmatrix} \cos\Delta\theta & \sin\Delta\theta \\ -\sin\Delta\theta & \cos\Delta\theta \end{pmatrix} \begin{pmatrix} Idm \\ Iqm \end{pmatrix} + \begin{pmatrix} \cos\Delta\theta & \sin\Delta\theta \\ -\sin\Delta\theta & \cos\Delta\theta \end{pmatrix} \begin{pmatrix} 0 & -wLq \\ wLd & 0 \end{pmatrix} \begin{pmatrix} Idm \\ Iqm \end{pmatrix} +$$

$$\begin{pmatrix} \cos\Delta\theta & \sin\Delta\theta \\ -\sin\Delta\theta & \cos\Delta\theta \end{pmatrix} \begin{pmatrix} 0 \\ w\phi \end{pmatrix}$$

$$= R \begin{pmatrix} Idc \\ Iqc \end{pmatrix} + \begin{pmatrix} \cos\Delta\theta & \sin\Delta\theta \\ -\sin\Delta\theta & \cos\Delta\theta \end{pmatrix} \begin{pmatrix} 0 & -wLq \\ wLd & 0 \end{pmatrix} \begin{pmatrix} \cos\Delta\theta & -\sin\Delta\theta \\ \sin\Delta\theta & \cos\Delta\theta \end{pmatrix} \begin{pmatrix} Idc \\ Iqc \end{pmatrix} +$$

$$\begin{pmatrix} w\phi \cdot \sin\Delta\theta \\ w\phi \cdot \cos\Delta\theta \end{pmatrix}$$

$$= R \begin{pmatrix} Idc \\ Iqc \end{pmatrix} + \begin{pmatrix} -w(Lq - Ld)\sin\Delta\theta \cdot \cos\Delta\theta - w(Lq \cdot \cos^2\Delta\theta + Ld \cdot \sin^2\Delta\theta) \\ w(Lq \cdot \cos^2\Delta\theta + Ld \cdot \sin^2\Delta\theta & w(Lq - Ld)\sin\Delta\theta \cdot \cos\Delta\theta \end{pmatrix} \begin{pmatrix} Idc \\ Iqc \end{pmatrix} +$$

$$\begin{pmatrix} w\phi \cdot \sin\Delta\theta \\ w\phi \cdot \cos\Delta\theta \end{pmatrix}$$

The d-phase voltage command Vdc can be expressed as shown in the following equation (17).

$$Vdc = R \cdot Idc - w(Lq-Ld)\sin\Delta\theta \cdot \cos\Delta\theta Idc - w(Lq \cdot \cos^2\Delta\theta + Ld \cdot \sin^2\Delta\theta)Iqc + w\phi \cdot \sin\Delta\theta \quad (17)$$

On the other hand, the q-phase voltage command Vqc can be expressed as shown in the following equation (18).

$$Vqc = R \cdot Iqc + w(Lq \cdot \cos^2\Delta\theta + Ld \cdot \sin^2\Delta\theta)Idc + w(Lq-Ld)\sin\Delta\theta \cdot \cos\Delta\theta \cdot Iqc + w\phi \cdot \cos\Delta\theta \quad (18)$$

Accordingly, the forward rotation d-phase voltage command $Vdc_P$ and the reverse rotation d-phase voltage command $Vdc_N$ can be expressed as shown in the following equations (19) and (20), respectively.

$$Vdc_P = R \cdot Idc_P - w_P(Lq-Ld)\sin\Delta\theta \cdot \cos\Delta\theta Idc_P - w_P(Lq \cdot \cos^2\Delta\theta + Ld \cdot \sin^2\Delta\theta) \cdot Iqc_P + w_P\phi \cdot \sin\Delta\theta \quad (19)$$

$$Vdc_N = R \cdot Idc_N - w_N(Lq-Ld)\sin\theta\Delta \cdot \cos\Delta\theta Idc_N - w_N(Lq \cdot \cos^2\Delta\theta + Ld \cdot \sin^2\Delta\theta) \cdot Iqc_N + w_N\phi \cdot \sin\Delta\theta \quad (20)$$

In the adjustment mode, which is performed in the speed range where field weakening is not needed and there is enough available voltage, the d-phase current flows as commanded and $Idc_P$ is substantially identical with $Idc_N$. On the other hand, since the q-phase current flows as a result of the speed control, $Iqc_P$ does not become identical with $Iqc_N$, though the generated torque T is the same in magnitude, because of the presence of the magnetic pole displacement $\Delta\theta$, In particular, in the case of a non-salient pole motor, since Ld=Lq, the equations (19) and (20) can be expressed as shown in the following equations (21) and (22), respectively, by assuming Ld=Lq=L. Since the speed control is performed with the magnetic pole displaced by $\theta\Delta$, it follows that $\omega_P = -\omega_N$, $Idc_P = Idc_N$, and $\omega_P \cdot Iqc_P \neq \omega_N \cdot Iqc_N$, which means that the d-phase voltage command differs according to the direction of rotation.

$$Vdc_P = R \cdot Idc_P - w_P L \cdot Iqc_P + w_P\phi \cdot \sin\Delta\theta \quad (21)$$

$$Vdc_N = R \cdot Idc_P + w_N L \cdot Iqc_P - w_N\phi \cdot \sin\Delta\theta \quad (22)$$

In step S110 of FIG. 2, the detection device 1 decides whether the absolute value of the difference "$Vdc_P - Vdc_N$" between the forward rotation d-phase voltage command and the reverse rotation d-phase voltage command, calculated in step S109, lies within a predetermined threshold value. If the absolute value of the difference "$Vdc_P - Vdc_N$" lies outside the predetermined threshold value, the process proceeds to step S111, but if it lies within the predetermined threshold value, the process proceeds to step S112.

In step S111, the detection device 1 sets a new candidate value by adding a value corresponding to the amount of magnetic pole displacement to the initial value or the candidate value when it is decided in step S110 that the absolute value of the difference "$Vdc_P - Vdc_N$" between the forward rotation d-phase voltage command and the reverse rotation d-phase voltage command lies outside the predetermined threshold value, and also sets a new magnetic pole position by displacing the magnetic pole initial position or the magnetic pole position by an amount equal to the amount of magnetic pole displacement.

In step S112, the detection device 1 determines the candidate value when it is decided in step S110 that the absolute value of the difference "$Vdc_P - Vdc_N$" between the forward rotation d-phase voltage command and the reverse rotation d-phase voltage command lies within the predetermined threshold value, and stores the thus determined candidate value as the magnetic pole correction value in memory.

The process from step S105 to step S112 is repeated until it is decided in step S110 that the absolute value of the difference "$Vdc_P - Vdc_N$" between the forward rotation d-phase voltage command and the reverse rotation d-phase voltage command lies within the predetermined threshold value.

The magnetic pole correction value determined in step S112 is used in step S113 to correct the magnetic pole initial position detected in the magnetic pole position detection process of step S101. As earlier described, the magnetic pole initial position detected in step S101 contains an error. Since this error is considered to have been caused mainly by a detection error of the magnetic pole initial position detected in step S101, the error contained in the magnetic pole initial position is eliminated in step S113 by subtracting the sensor reference position from the magnetic pole correction value determined in step S112 and by adding the result of the subtraction to the magnetic pole initial position. The resulting sum is stored as the corrected magnetic pole initial position in memory. The corrected magnetic pole initial position thus determined is used as the reference magnetic pole position when controlling the rotation of the synchronous motor that is not equipped with a magnetic pole position sensor.

Let $\theta_0$ denote the magnetic pole initial position detected in step S101, pole denote the number of pole pairs in the synchronous motor, and $\Delta fb$ denote the position feedback difference of the synchronous motor sensor; then, the magnetic pole position $\theta$ is expressed by the following equation (23).

$$\theta = \theta o + \Sigma pole \cdot \Delta fb$$

Let $\theta r$ denote the determined magnetic pole correction value, $\theta_1$ denote the magnetic pole position relative to the magnetic pole initial position corresponding to the sensor reference position, and $\Delta\theta$ denote the amount of magnetic pole displacement; then, the amount of correction is given as $\Delta\theta = \theta r - \theta_1$, and the corrected magnetic pole position $\theta$ is expressed by the following equation (24).

$$\theta = \theta o + \Sigma pole \cdot \Delta fb + \Delta\theta \quad (24)$$

Figure 5:
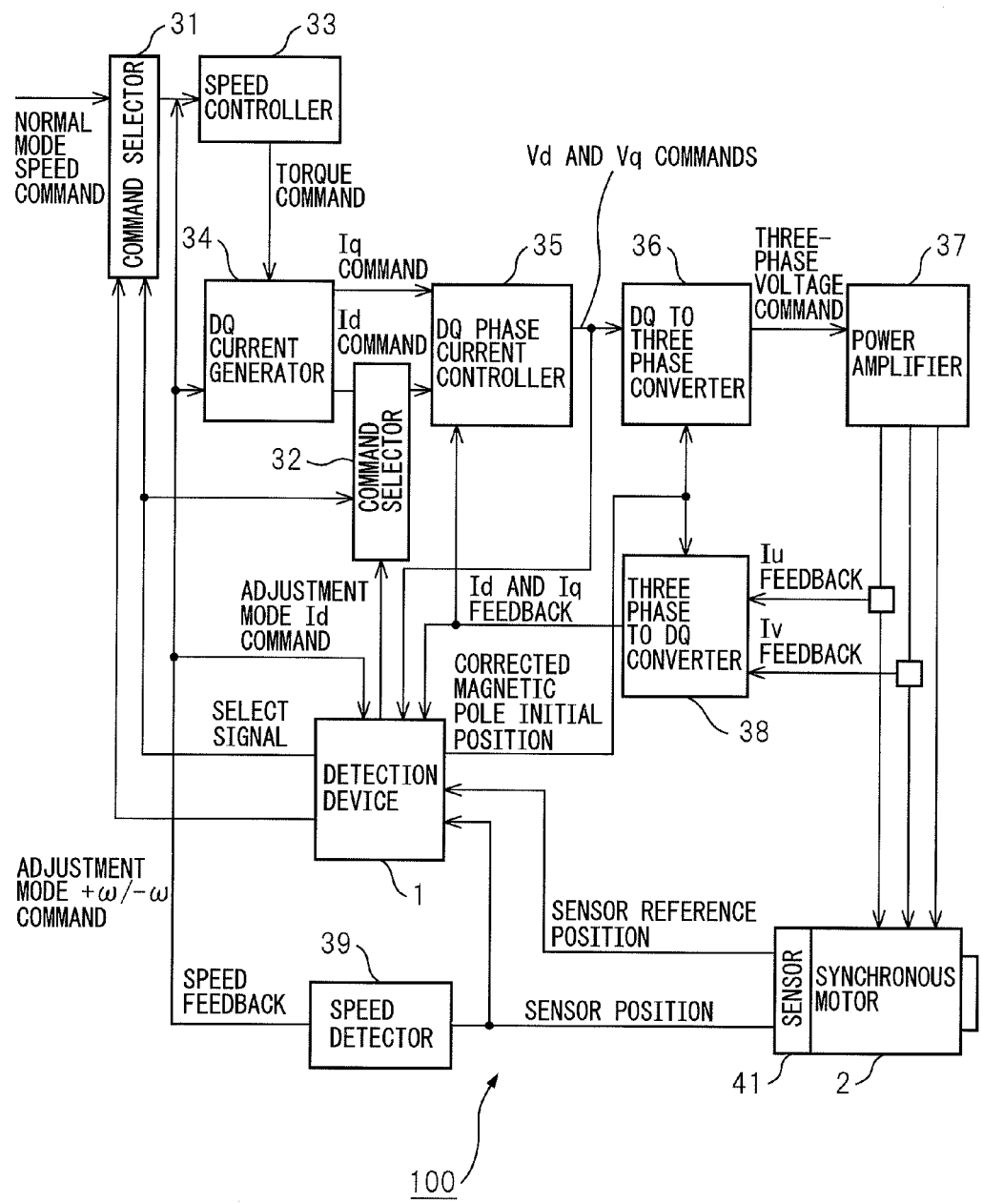
FIG. 5 is a block diagram showing a synchronous motor control apparatus equipped with the detection device according to the first embodiment of the present invention.

FIG. 5 is a block diagram showing a synchronous motor control apparatus equipped with the detection device according to the first embodiment of the present invention. The detection device 1 according to the first embodiment of the present invention is implemented as one function within the control apparatus 100 that controls the rotation of the synchronous motor.

Command selectors 31 and 32 are selectors for switching the command to be used between the adjustment mode and the normal operation mode. The command selector 31, under the control of a select signal from the detection device 1, selects an externally applied speed command in the normal operation mode and selects in the adjustment mode a forward/reverse speed command applied from the detection device 1, and directs the selected speed command to a speed controller 33. Likewise, the command selector 32, under the control of the select signal from the detection device 1, selects in the normal operation mode a d-phase current command Id applied from a DQ current generator 34 and selects in the adjustment mode a d-phase current command Id applied from the detection device 1, and directs the selected current command to a DQ phase current controller 35.

The speed controller 33 supplies a torque command to the DQ current generator 34, based, in the normal operation mode, on the externally applied speed command and, in the adjustment mode, on the forward/reverse speed command from the detection device 1.

The DQ current generator 34 generates the d-phase current command Id and q-phase current command Iq, based on the torque command from the speed controller 33 and on a speed feedback signal from a speed detector 39 indicating the rotational speed of the synchronous motor 2.

The DQ phase current controller 35 generates a d-phase voltage command Vd and a q-phase voltage command Vq, based on the q-phase current command Iq from the DQ current generator 34, the d-phase current command Id from the DQ current generator 34 in the normal operation mode or the d-phase current command Id from the detection device 1 in the adjustment mode, and the d-phase current feedback value Id and q-phase current feedback value Iq.

A DQ to three phase converter 36 performs a DQ-to-three-phase conversion on the d-phase voltage command Vd and q-phase voltage command Vq at the magnetic pole position detected relative to the corrected magnetic pole initial position generated by the detection device 1, and generates a three-phase voltage command which is supplied to a power amplifier 37.

The power amplifier 37, in response to the three-phase voltage command, applies a three-phase drive voltage to the synchronous motor 2.

A three phase to DQ converter 38 detects currents (for example, a u-phase current Iu and a v-phase current Iv) flowing into the synchronous motor 2 to which the three-phase drive voltage is applied, performs a three-phase-to-DQ conversion on the detected currents at the magnetic pole position detected relative to the corrected magnetic pole initial position generated by the detection device 1, and generates the d-phase current feedback value Id and q-phase current feedback value Iq which are supplied to the detection device 1.

The speed detector 39 generates the speed feedback signal from a sensor position signal received from a sensor 41.

The synchronous motor 2 is driven for rotation by the three-phase drive voltage applied to it. In the normal operation mode, the rotation of the synchronous motor 2 is controlled by the externally applied speed command, based on the magnetic pole position detected by reference to the corrected magnetic pole initial position set by the detection device 1. In the adjustment mode, the synchronous motor 2 is driven for rotation by the command supplied from the detection device 1.

The sensor 41 is mounted with the sensor reference position arbitrary located at the 0-degree position of the motor magnetic pole, and outputs the sensor reference position as well as the rotational position of the synchronous motor 2.

The detection device 1 performs the above processing based on the present position signal and sensor reference position signal from the sensor 41 and on the d-q phase feedback (or command) signals Id and Iq and the d-q phase voltage commands Vd and Vq, and generates and outputs signals relating to the "corrected magnetic pole initial position".

Figure 6:
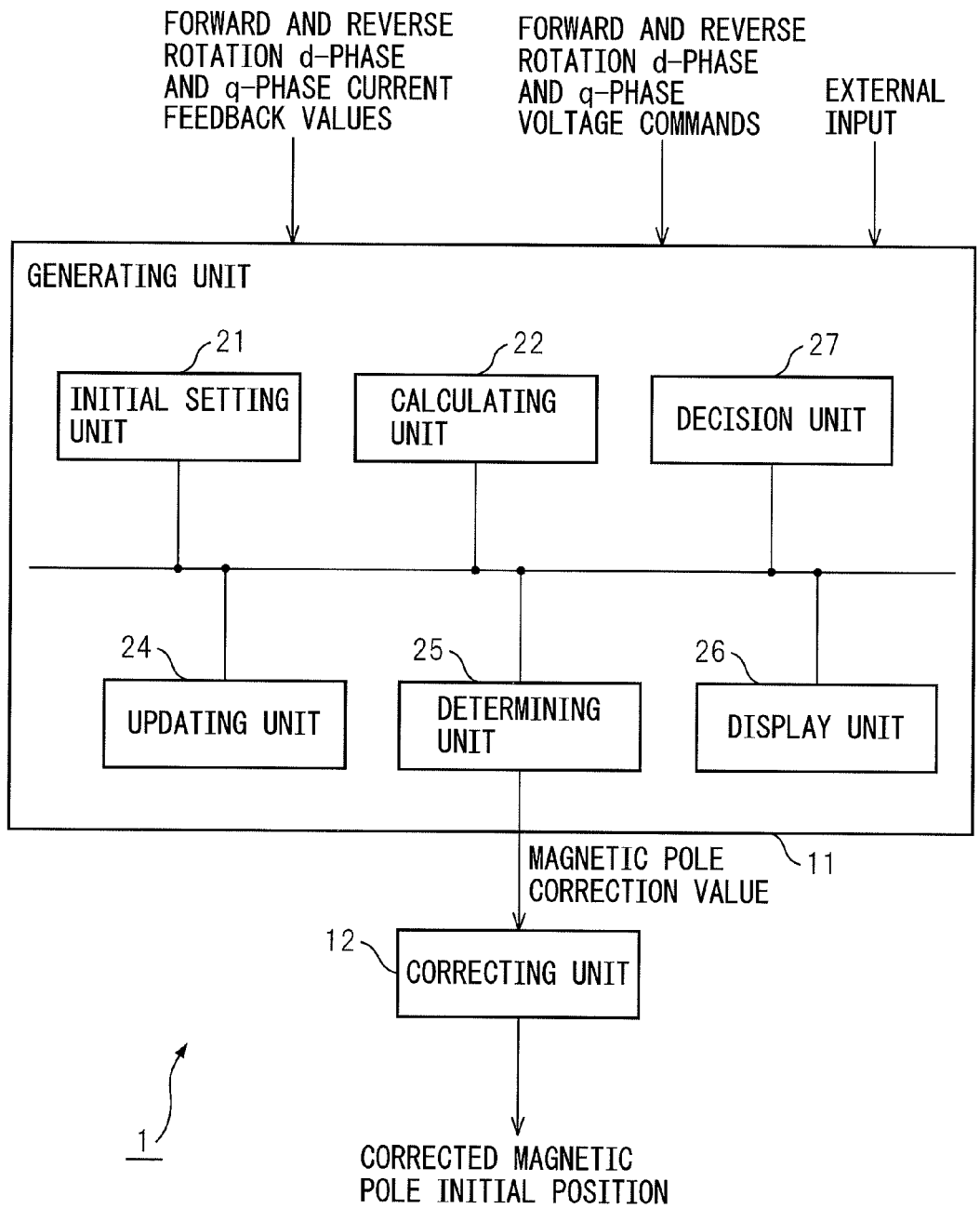
FIG. 6 is a basic functional block diagram of a detection device according to a second embodiment of the present invention.

FIG. 6 is a basic functional block diagram of a detection device according to a second embodiment of the present invention. In the second embodiment of the present invention, the amount of magnetic pole displacement and the absolute value of the difference "$Vdc_P - Vdc_N$" between the forward rotation d-phase voltage command and the reverse rotation d-phase voltage command, both calculated in the first embodiment described with reference to FIG. 1, are displayed on a display apparatus for viewing by the user so that user-entered data can be reflected in the correction of the magnetic pole initial position.

The generating unit 11 of the detection device 1 according to the second embodiment of the present invention includes, in addition to the initial setting unit 21, calculating unit 22, updating unit 24, and determining unit 25 described with reference to FIG. 1, a display unit 26 for causing the initial candidate value set by the initial setting unit 21, as well as the amount of magnetic pole displacement and the difference between the forward rotation d-phase voltage command and the reverse rotation d-phase voltage command, both calculated by the calculating unit 22, to be displayed on an external display apparatus, and a decision unit 27 for deciding whether an externally supplied termination command has been received or not. The external display apparatus that produces the display under the control of the display unit 26 may be a known display apparatus. Further, though not specifically illustrated, provisions are made to allow the user to enter data from various kinds of external input devices such as a keyboard and a coordinate input device.

The decision unit 27 in the generating unit 11 decides whether a termination command has been received from an external device. The termination command is entered from a suitable one of the various kinds of input devices.

If it is decided by the decision unit 27 that no such termination command has been received, the updating unit 24 in the generating unit 11 sets a new candidate value by adding a value corresponding to an "externally supplied amount" to the initial value or the candidate value, and also sets a new magnetic pole position by displacing the magnetic pole initial position or the magnetic pole position by an amount equal to the externally supplied amount. The "externally supplied amount" can be set as desired by the user. Further, in the second embodiment, as in the first embodiment, the prescribed d-phase current command applied to the synchronous motor by the generating unit 11 is a constant value when the synchronous motor is a non-salient pole synchronous motor, and zero when the synchronous motor is a salient-pole synchronous motor.

If it is determined by the decision unit 27 that the termination command has been received, the determining unit 25 in the generating unit 11 stores the candidate value as the determined magnetic pole correction value in memory.

The other component elements constituting the circuit are the same as the corresponding component elements depicted in FIG. 5; therefore, the same component elements are designated by the same reference numerals, and such component elements will not be further described herein.

In the generating unit 11, the calculating unit 22 and the updating unit 24 repeat the above calculation and update process until the decision unit 27 decides that the termination command has been received.

Then, the correcting unit 12 corrects the magnetic pole initial position by subtracting the sensor reference position from the magnetic pole correction value and by adding the result of the subtraction to the magnetic pole initial position.

Figure 7:
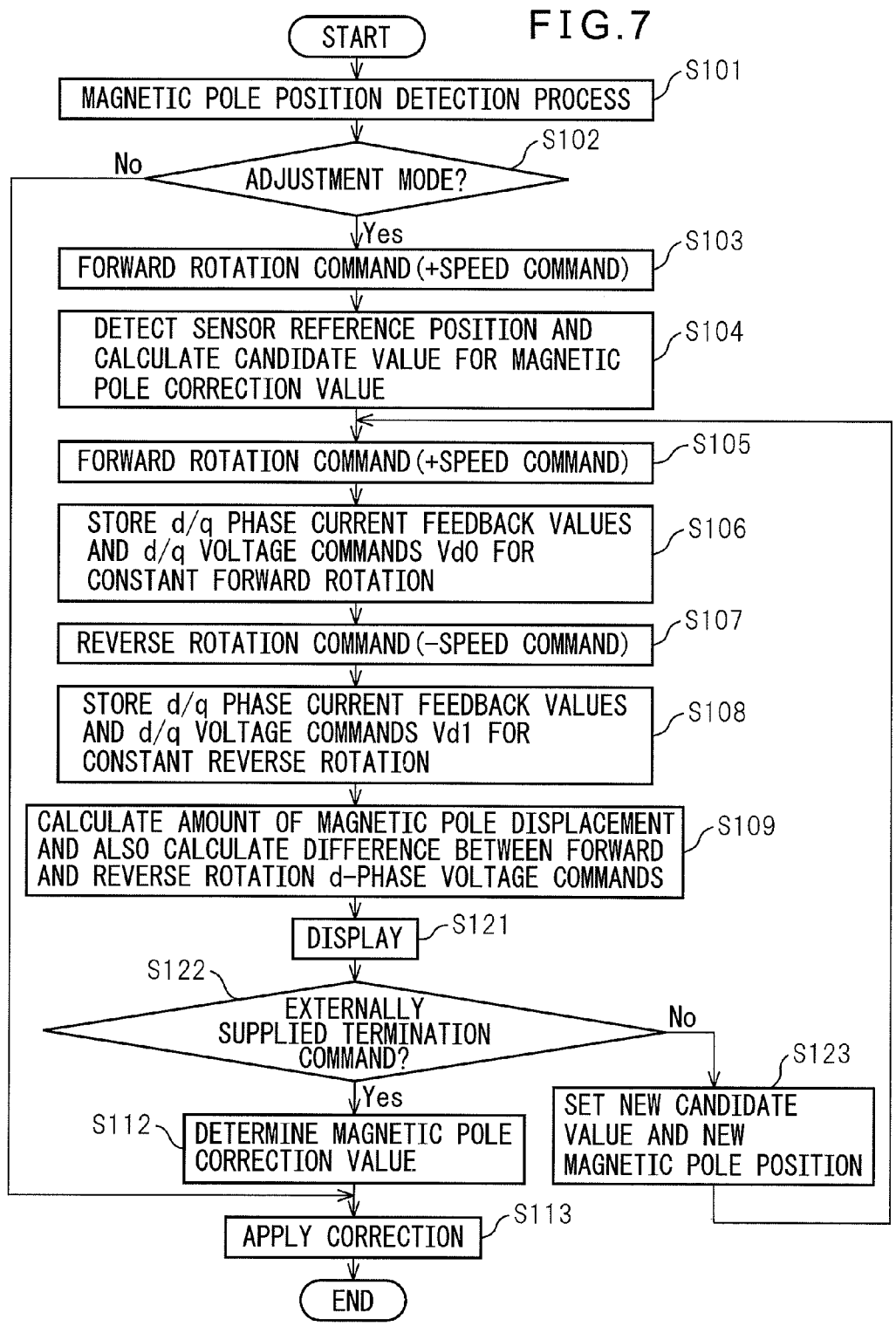
FIG. 7 is a flowchart illustrating the operation flow of the detection device according to the second embodiment of the present invention.

FIG. 7 is a flowchart illustrating the operation flow of the detection device according to the second embodiment of the present invention. In the second embodiment of the present invention, steps S101 to S109 and S112 are the same as the corresponding steps S101 to S109 and S112 in the first embodiment.

In step S121, the detection device 1 causes the amount of magnetic pole displacement and the difference between the forward rotation d-phase voltage command and the reverse rotation d-phase voltage command, both calculated in step S109, to be displayed on the display apparatus. In step S121, the sensor reference position and the initial candidate value for the magnetic pole correction value, both calculated in step S104, may also be displayed on the display apparatus.

In step S122, the detection device 1 decides whether an externally supplied termination command has been received or not. If no such termination command has been received, the process proceeds to step S123, but if the termination command has been received, the process proceeds to step S112.

In step S123, the detection device 1 sets a new candidate value by adding a value corresponding to the "externally supplied amount" to the initial value or the candidate value, and also sets a new magnetic pole position by displacing the magnetic pole initial position or the magnetic pole position by an amount equal to the externally supplied amount. The "externally supplied amount" can be set as desired by the user.

In step S112, the detection device 1 determines the candidate value when it is decided that the termination command has been received, and stores the thus determined candidate value as the magnetic pole correction value in a nonvolatile memory.

The process of steps S105 to S109, S112, and S121 to S123 is repeated until it is decided in step S122 that the termination command has been received.

The magnetic pole correction value determined in step S112 is used in step S113 to correct the magnetic pole initial position detected in the magnetic pole position detection process of step S101. As earlier described, the magnetic pole initial position detected in step S101 contains an error. Since this error is considered to have been caused mainly by a detection error at the time of detecting the magnetic pole initial position, the error is eliminated in step S113 by subtracting the magnetic pole position corresponding to the sensor reference position from the magnetic pole correction value determined and stored in the nonvolatile memory in step S112 and by adding the result of the subtraction to the magnetic pole initial position. The resulting sum is stored as the corrected magnetic pole initial position and is used as the magnetic pole control position. Since the "externally supplied amount" as the user-entered data is used when generating the magnetic pole correction value, as described above, the data entered by the user can be reflected in the correction of the magnetic pole initial position. The corrected magnetic pole initial position thus determined is used as the reference magnetic pole position when controlling the rotation of the synchronous motor that is not equipped with a magnetic pole position sensor.

Figure 8:
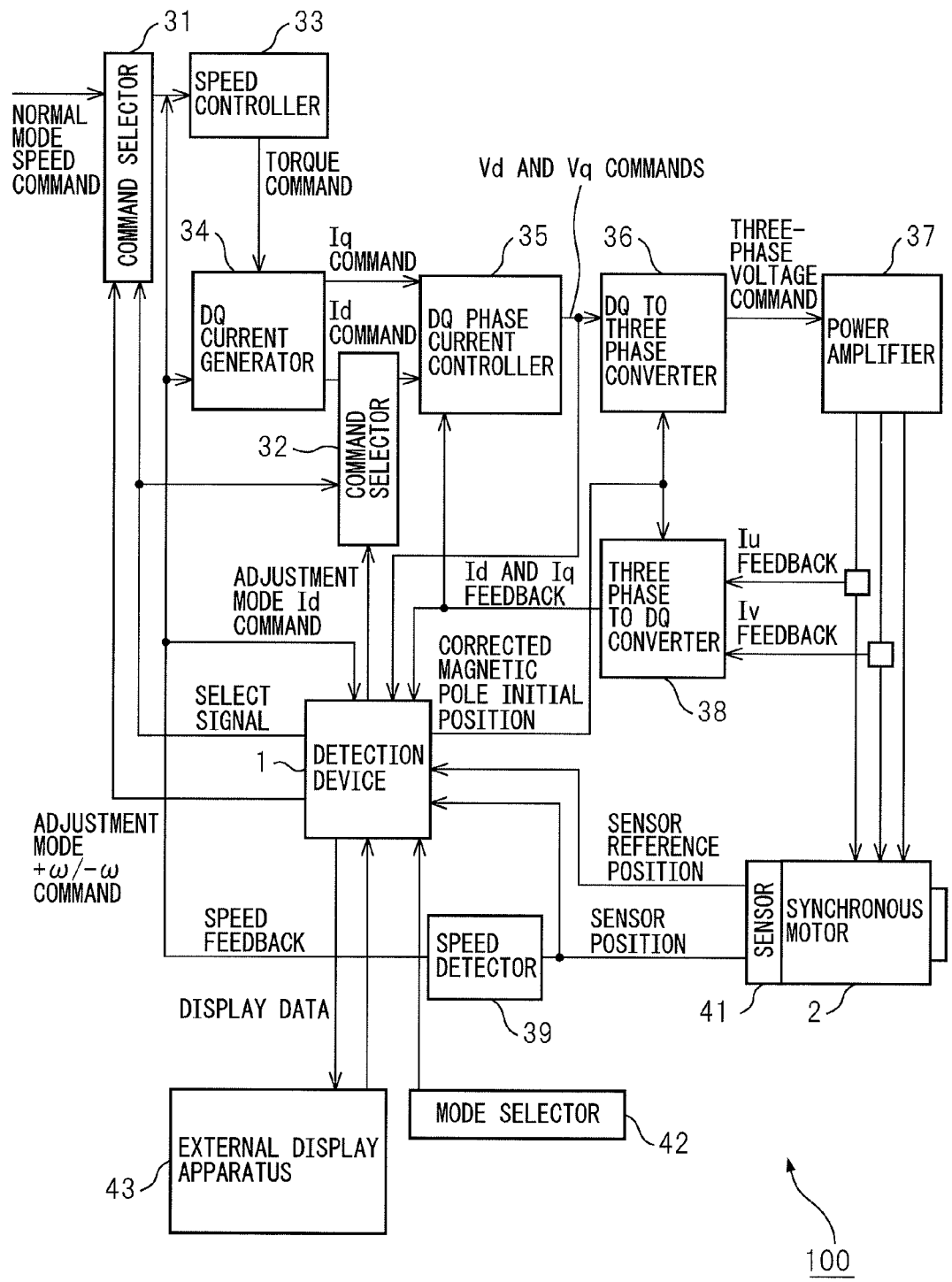
FIG. 8 is a block diagram showing a synchronous motor control apparatus equipped with the detection device according to the second embodiment of the present invention.

FIG. 8 is a block diagram showing a synchronous motor control apparatus equipped with the detection device according to the second embodiment of the present invention. As in the first embodiment, the detection device 1 according to the second embodiment of the present invention is also implemented as one function within the control apparatus 100 that controls the rotation of the synchronous motor.

The detection device 1 supplies display data to the external display apparatus 43. The display data includes such information as the amount of magnetic pole displacement, the difference between the forward rotation d-phase voltage command and the reverse rotation d-phase voltage command, the sensor reference position, the corrected magnetic pole initial position, the uncorrected magnetic pole initial position, the determined magnetic pole correction value, the candidate value for the magnetic pole correction value and its initial value, and the termination command, but may also include other information.

The other component elements constituting the circuit are the same as the corresponding component elements depicted in FIG. 5; therefore, the same component elements are designated by the same reference numerals, and such component elements will not be further described herein. The control apparatus 100 may further include a mode selector 42 so that a selection can be made between the normal operation mode and the adjustment mode.

The present invention can be applied to a synchronous motor not equipped with a magnetic pole position sensor. The synchronous motor may be a salient-pole motor or a non-salient pole motor.

According to the detection device of the present invention, the magnetic pole correction value can be detected with high accuracy and in a short time for a synchronous motor not equipped with a magnetic pole position sensor and whose rotation is controlled based on a d-phase current command and a q-phase current command. Further, according to the detection device of the present invention, since the magnetic pole correction value is generated by driving the synchronous motor in the forward and reverse directions, respectively, the amount of error contained in the magnetic pole correction value can be further reduced compared with the prior art. Furthermore, according to the detection device of the present invention, since the amount of error contained in the magnetic pole correction value generated by the detection device is reduced as described above, an appropriate d-phase current can be supplied to the synchronous motor to control the rotation of the synchronous motor, while preventing the applied drive voltage from dropping below the required level, and stable control of the synchronous motor can thus be achieved. The detection device and the control apparatus according to the present invention can be applied to any type of synchronous motor, whether it be a salient-pole type or a non-salient pole type.

What is claimed is:

1. A detection device for detecting a magnetic pole position of a synchronous motor that is controlled based on a d-phase current command and a q-phase current command, comprising:

generating unit for generating a magnetic pole correction value based on a difference between a forward rotation d-phase voltage command and a reverse rotation d-phase voltage command, said d-phase voltage commands being used for rotating said synchronous motor and generated when said synchronous motor is driven in forward and reverse directions, respectively, by applying a prescribed d-phase current command after detecting a magnetic pole initial position in a magnetic pole detection process performed after power on of said synchronous motor; and correcting unit for correcting said magnetic pole initial position based on said magnetic pole correction value and on a sensor reference position which defines a reference position of a sensor attached to said synchronous motor, wherein said generating unit comprises:

initial setting unit for setting an initial candidate value for said magnetic pole correction value by reference to said magnetic pole initial position detected in said magnetic pole detection process performed after power on of said synchronous motor;

calculating unit for calculating an amount of magnetic pole displacement representing an axis displacement between d-q axes of a control system and d-q axes of a motor system, based on a d-phase voltage command and a q-phase voltage command and on a d-phase current feedback value and a q-phase current feedback value of motor currents flowing into said synchronous motor and detected when said synchronous motor is driven in said forward and reverse directions, respectively, by applying said prescribed d-phase current command under conditions of either said initial value and said magnetic pole initial position or said set candidate value and said magnetic pole position, and for calculating the difference between said forward rotation d-phase voltage command and said reverse rotation d-phase voltage command;

decision unit for deciding whether the difference between said forward rotation d-phase voltage command and said reverse rotation d-phase voltage command, calculated by said calculating unit, lies within a predetermined threshold value;

updating unit for setting a new candidate value by adding a value corresponding to said amount of magnetic pole displacement to said initial value or said candidate value when it is decided by said decision unit that said difference lies outside said predetermined threshold value, and for setting a new magnetic pole position by displacing said magnetic pole initial position or said magnetic pole position by an amount equal to said amount of magnetic pole displacement; and determining unit for determining said candidate value when it is decided by said decision unit that said difference lies within said predetermined threshold value, and for storing said determined candidate value as said magnetic pole correction value in a memory, and wherein said calculating unit and said updating unit repeat said calculation and updating until said decision unit decides that said difference lies within said predetermined threshold value.

2. The detection device according to claim 1, wherein said prescribed d-phase current command applied to said synchronous motor by said generating unit is a nonzero constant value when said synchronous motor is a non-salient pole synchronous motor, and zero when said synchronous motor is a salient-pole synchronous motor.

* * * * *